United States Patent

[11] 3,573,576

| [72] | Inventor | Toshio Nakabo |
| --- | --- | --- |
| | | Osaka-fu, Japan |
| [21] | Appl. No. | 675,267 |
| [22] | Filed | Sept. 6, 1967 |
| [45] | Patented | Apr. 6, 1971 |
| [73] | Assignee | Ohbayashi-Gumi, Ltd. |
| | | Osaka-shi, Japan |
| [32] | Priority | Jan. 18, 1964 |
| [33] | | Japan |
| [31] | | 39/2223 |
| | | Continuation-in-part of application Ser. No. 412,519, Nov. 19, 1964, now abandoned. |

[54] AUTOMATIC REMOTE CONTROL SYSTEM FOR SEQUENTIALLY STARTING AIR-CONDITIONING EQUIPMENT
6 Claims, 4 Drawing Figs.

| [52] | U.S. Cl. | 318/102, 307/38 |
| --- | --- | --- |
| [51] | Int. Cl. | H02p 1/54 |
| [50] | Field of Search | 318/102; 307/38, 41 |

[56] References Cited
UNITED STATES PATENTS

| 2,881,832 | 4/1959 | Leonard | 307/41 |
| --- | --- | --- | --- |
| 3,221,174 | 11/1965 | Jacobs | 307/41 |
| 3,309,543 | 3/1967 | Alston | 307/41 |
| 3,320,431 | 5/1967 | Bough | 307/38 |
| 3,358,161 | 12/1967 | Claiborne | 307/38 |
| 3,426,259 | 2/1969 | Ziehm | 318/102 |

Primary Examiner—Benjmain Dobeck
Attorney—Anton J. Wille

ABSTRACT: A plugboard having row and column connections is used to program the switch-on and switch-off time of air-conditioning units, arranged in groups; to prevent the sudden surge of starting current upon simultaneous energization of a multiplicity of air-conditioning subunits, a sequence switching device, such as a stepping switch interconnects individual air-conditioning subunits within a group sequentially to the power source; the sequence switching device is controlled by a pulse source providing sequential connecting pulses.

INVENTOR.
TOSHIO NAKABO

AUTOMATIC REMOTE CONTROL SYSTEM FOR SEQUENTIALLY STARTING AIR-CONDITIONING EQUIPMENT

The present application is a continuation in part of my earlier application Ser. No. 412,519 filed Nov. 9, 1964 now abandoned.

The present invention relates to an automatic remote control system for air-conditioning equipment suitable for the air-conditioning of space in large buildings, in which various spaces require air-conditioning at different times, in accordance with specific desired use.

Large buildings often have a central control room for air-conditioning equipment. According to one form of remote control, a distribution board with an array of pushbuttons thereon controls the various equipments, selectively located in various portions of the building.

Multiple use buildings, such as buildings having storage spaces, retail shops, restaurants, office space, and residential space, with various tenants having staggered or different work hours either require independently controlled time mechanisms to switch the air-conditioning units on and off, as desired, or an array of pushbuttons to provide individual time control. Yet, a number of business establishments may have the same hours for individual air-conditioning equipment—for example, offices. If a plurality of air-conditioning machines are all started at the same time, the power demand and the current loading of the wires into the building may become excessive and cause dangerous overheating or electrical failure.

It is an object of the present invention to provide an air-conditioning control system which is flexible, in that it can be programmed in accordance with the requirements of individual users, and yet not overload electrical supplies if a number of air-conditioning units at a given time are to be connected simultaneously.

SUBJECT MATTER OF THE PRESENT INVENTION

Briefly, in accordance with the present invention, the automatic system for air-conditioning apparatus to be connected in groups utilizes a clock pulse source, timed, for example, in minute intervals which applies pulses to a connecting group of a plugboard having row group connections and column group connections. The other group connection is then, individually, connected to groups of air-conditioning equipment, one group each being assigned to a tenant who wishes to have his equipment all connected at the same time. To provide for specific time control, the clock pulses can be connected to a stepping switch, such as, for example, a telephone-type stepping switch, a flip-flop type counter, or the like, to provide pulses every 10 or 15 minutes or so, and one of the group-connection, the one to which the timing pulses are applied, have sufficient individual lines for each 10 or 15 minute interval of the 24 hours of the day. By suitable pins, interconnecting row and column connections, specific on and off times for specific air-conditioning can then be programmed. In order to prevent a surge of starting current due to simultaneous starting of a plurality of air-conditioning units in a group, a connecting pulse source is provided, providing sequential connecting pulses which are timed to have a predetermined relation to that period which is required for the starting current surge to subside to the normal running value. Another sequence switcher, which can be again a stepping switch, it then enabled by the connecting pulse and provides for individual interconnection of any one subunit within a group, only after the time interval for the previously connected subunit has elapsed which is required for the current to operate the previously connected subunit to drop to its normal operating or running value.

The connecting pulse source may have a repetition rate of, for example, once a second; by using a stepping switch as the sequence switching arrangement for the connecting pulses, different time periods, to accommodate units of different sizes, can readily be connected so that a larger unit, for example, may have an elapsed time delay of 3 seconds whereas a smaller unit may require an elapsed time delay of, for example, only 2 seconds.

The structure, organization, and operation of the invention will now be described more specifically with reference to the accompanying drawings, wherein.

Figure 1:
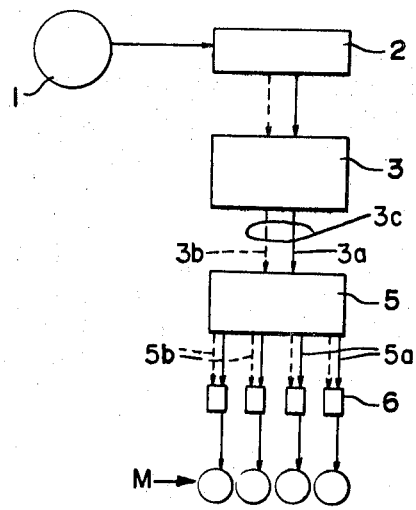
FIG. 1 is a schematic diagram of an illustrative embodiment of the invention, in block form.
Figure 2:
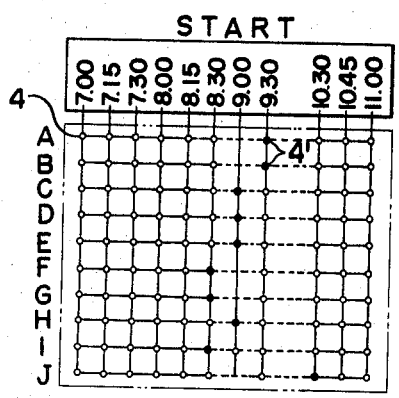
FIGS. 2 and 3 are schematic diagrams of a plugboard.
Figure 3:
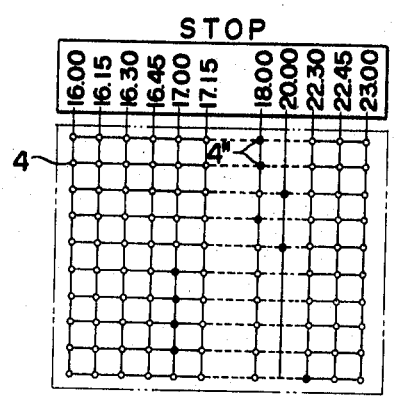

Referring now to the drawings, and more particularly to FIG. 1:

A master clock 1 is arranged to provide pulses at, for example, 1 minute intervals. The pulses are applied to a divider circuit 2, which may be a stepping relay well known in the telephone art, a binary counter, or the like, counting down 15 pulses and then issuing pulse on its own which is applied from pulse-time divider 2 to a pinboard 3. Such dividers are described in "Computer Handbook" by H. D. Huskey and G. A. Korn (McGraw Hill Book Co., 1962). The divider 2 could also contain a monostable multivibrator whose duty cycle is preset to provide specified divided output. Pinboard 3 consists of two units, a start unit, shown in detail in FIG. 2, and a stop unit, shown in detail in FIG. 3. The subunits have vertical column lines marked and arranged, for example, in 15 minute or half hour intervals; they also have horizontal or row lines, marked with capitals A to J if 10 groups of air-conditioning units are to be connected. These horizontal lines control the air-conditioning for, for example, retail shops, general offices, restaurants, or the like. The vertical time lines and the horizontal equipment lines are spaced behind each other and pins or plugs may be inserted through holes 4 in the front of the board to interconnect time (column) lines and equipment (row) lines. For example, if it is desired to operate air-conditioning equipment assigned to groups A and B from 9:30 in the morning, pins are inserted at the 9:30 column in rows A and B, as seen at 4' in FIG. 2. To turn this equipment off at 6:00 in the afternoon, pins 4'' are inserted at 1800 as seen in FIG. 3. Such plugboards or pinboards by themselves are well-known in the art and need not be described further.

The start and stop control pulses are brought out from the pinboard 3 (FIG. 1) over a cable 3c; the start and the stop lines for a single group are schematically shown by lines 3a and 3b, respectively.

Lines 3a and 3b connect to a motor control panel 5, from which lines 5a (to start) and 5b (to stop) connect to motor start-stop relays 6 to control individual motors M in a group. These arrangement are shown in FIG. 4 in greater detail.

Figure 4:
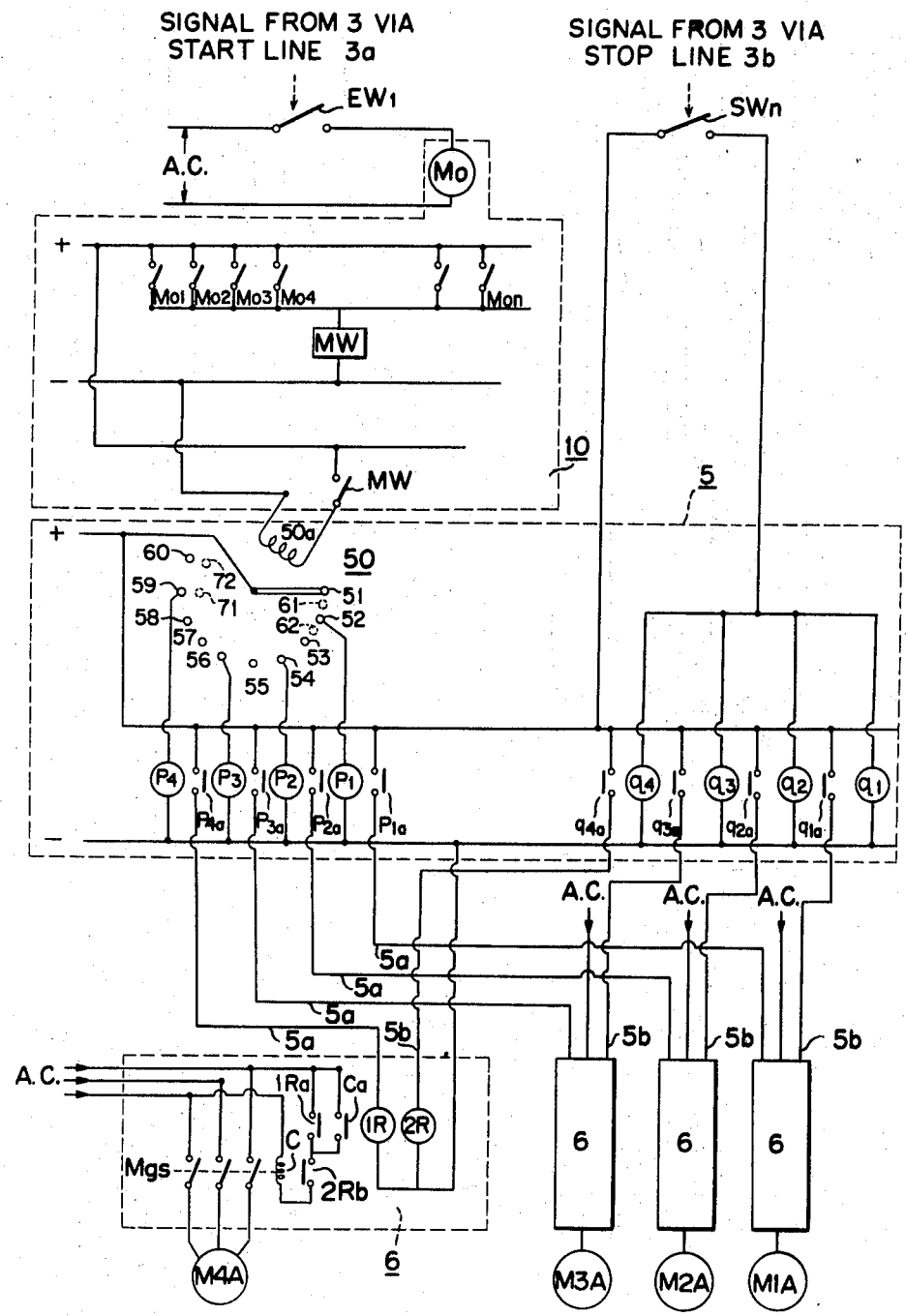
FIG. 4 is a schematic diagram of the sequence switching arrangements for individual air-conditioning units within a group or several groups.

Referring now to FIG. 4, a signal from the pinboard 3, which is, for example, to operate air-conditioning equipment assigned to Group A, energizes relay $EV_1$ via line 3a to switch on the switch therefor to complete a circuit for driving motor Mo. When the motor Mo actuates switch Mo through Mo belonging to motor Mo successively open and close with an interval of, for example, one second. This one-second pulse train is transmitted to a coil 50a of stepping relay 50 through relay MW. Each time that a pulse is obtained from the explained pulse source designated by 10, the stepping relay 50 steps by one contact, for example, from contact 51 to contact 52.

The start lines 5a for individual motors M are connected relays 6, shown in great detail with respect to the fourth motor of Group A, and labeled M4A. The stepping relay 50 steps by one contact for each pulse from source 10, as explained; after one pulse it will have stepped from contact 51 to contact 52 energizing M1A through relay $P_1$ and its switch $P_{1a}$, line 5a and motor start-stop relay 6; 2 seconds later, motor M2A will be energized and in the same way 2 seconds later, motor M3A will be energized. If motor M3A is larger than the motors for unit M4A, more time will be needed until the current decays to a value which can be handled readily by the power system and 3 seconds need lapse; this is shown by the connection of relay for motor M4A three terminals further, that is, to terminal 59.

Line 5a connects to a start relay coil 1R of the relay system 6, which, upon being energized, switch 1Ra closes to energize the coil C closing switch Ca to form a holding circuit, the energized coil C closing the contacts Mgs to apply current to motor A4A from AC source. When a stop signal is derived from stop pinboard, it is transmitted via line 3b to stop-relay SWn to close its make contact to operate relays $q_4$ and 2R and its brake contact 2Rb to deenergize coil C for stopping motor M4A. Since upon disconnecting no rush of current is experienced, no special precautions need be taken and all units may be disconnected at the same time. Ordinarily, the inertia in power systems is sufficiently great to absorb sudden disconnecting surges.

Each one of the groups A, B ... J of air-conditioning units are assigned a separate stepping switch 50. For economy of material, these separate stepping switches may be assembled on one shaft, with separate stepping contacts, and separate wipers engaging the separate stepping contacts. In order to avoid simultaneous starting of two motors of groups scheduled to start at the same preset time, for example, Groups A and B, as indicated in FIG. 2, the various contacts of the stacked groups may be staggered and offset from each other, as shown, for example, by dotted contacts 61, 62. Alternatively, contacts of successive groups may be arranged sequentially around the circumference of the stepping relay, as indicated, for example, by contacts 71, 72, 73, offset 180° with respect to contacts 51, 52 ... . If additional contacts are required, ganged stepping relays with transfer contacts to transfer the connection from one set of contact groups, such as contacts 51—60 to another contact group stacked there beneath (or thereabove) may be used. Such stepping relays are well-known in the art and need not be described in detail.

As an alternative to the use of stepping relays, solid-state logic circuitry may be used, for example, flip-flop circuits sequentially changing state and, upon change of state, selectively and sequentially energizing individual air-conditioning units indicated by motors M1A, M2A, etc. For a reference to solid state circuitry used for such sequential connections, the General Electric Transistor Manual, chapter on digital circuitry may be referred to, as well as other literature well-known in the art. Likewise, connecting pulse source 10 may be in the form of a multivibrator circuit, the time of which is adjustable, for example, by varying a RC circuit therein.

The control circuit of the present invention, providing for timed, sequential turn-on of air-conditioning equipment can also be used to turn on individual units, or motors, connected in groups, in short time intervals and sufficient to avoid excessive starting currents of equipment other than air conditioners.

To prevent continuous operation of the stepping relay 50, which might wear out the contacts, a switch can be interposed in the line from pulse source 10 to coil 50a, closing the circuit upon activation of line 3a. The circuit can be interrupted, for example, automatically after the switch contact has made a predetermined number of revolutions or after a predetermined time has elapsed.

Considering the remote control system as described, a tenant upon the signing of a lease for space in a building will indicate the working hours of the office staff or the store hours should the lease be for a store in the building. With this information as to hours of usage, pins are then inserted in the particular time column and particular area row in the start pinboard. Pins are also inserted in the stop pinboard of FIG. 3 in the time column and area row for shutting off the air-conditioning equipment. The settings of the start and stop pinboard may be kept for the entire leasehold, or may readily be changed depending upon the season of the year or for other reasons, by merely moving the pins in either or both pinboards to a new time column.

With the pins inserted in the start pinboard of FIG. 2, a circuit is completed from the pulse time divider 2, through the pinboard connection, through the pulse unit 10 to the stepping switch 50. When an electrical signal is provided by the master clock 1 through the pulse time divider 2, the connections provided through the pinboard 3 will provide an electrical signal for relay EW1 which closes its switch and actuates the pulse unit motor Mo. The driving motor in turn successively opens and closes its switches Mo1, Mo2,...Mon at approximately one second intervals. These signals are then applied to the stepping coil 50a of the stepping switch which steps the switch arm from contact 51 to contact 52, and so on. With the switch arm engaging the contact 52 for example, of the stepping switch, the relay Pl is energized to close its contact Pla to energize the motor relay 6. With the energization of the motor relay 6, motor M1A is operated to drive the air-conditioning unit in the particular area determined by the pin in the area row of the pinboard and at a time designated by the selected opening for the pin in the time column of the start pinboard 3. Motor M1A is thus energized to operate the particular equipment and is maintained operative until such time when the motor control relay 6 is deenergized by a signal from the stop pinboard of FIG. 3.

With the master clock 1 providing timed impulses to the pulse divider circuit 2, a circuit will be completed for a given area and at a given time to shut off the motor M1A through the energization of the relay SWn via line 3b. Upon energization of the relay SWn a circuit is then completed through relay q1 to close its respective contact and deenergize the motor control relay 6 to stop the operation of the motor in a particular area.

It will thus be seen that there is provided a very simple system for automatical controlling the sequential operation of air-conditioning equipment, the arrangement being such that an area and time are readily selectable, a change in time of operation being quickly made by changing the pinboard terminals.

I claim:

1. Automatic control system for control of separate units of air-conditioning apparatus, comprising:
    a clock pulse source repetitively providing electrical pulses at minute intervals;
    a pinboard including row connections, column connections and pin interconnecting elements for interconnecting desired row connections and column connections;
    means for connecting the clock pulse source to one of said pinboard connections;
    control circuits for the air-conditioning units;
    means for connecting said control circuits to the other of said pinboard connections, the location of the pin interconnecting elements in the pinboard providing selective interconnections between the control circuits and the clock pulse source; and
    means connected in said control circuits to stagger, with respect to time, the connections of the units, said means including a pulse generator providing pulses at a repetitive rate having a predetermined relation to the elapsed time at which normal running current is established through any unit after having been switched on, and sequence switching means, energized by the pulse generator pulses, for connecting the units to a power source sequentially to start said units and avoid the sudden surge of starting current due to a simultaneous starting of a plurality of units.

2. System as claimed in claim 1, wherein said clock pulse source connecting means includes a pulse time divider circuit having said clock pulses applied thereto and providing outputs at predetermined intervals corresponding to multiples of said pulse times, the output of said pulse-time divider circuit at said predetermined intervals being applied to said one connection.

3. System as claimed in claim 2, wherein said pulse-time divider circuit provides outputs at intervals of from 10 to 15 minutes.

4. System as claimed in claim 1, wherein said sequence switching means has a plurality of similar groups of contacts, one group of contacts each being assigned to a group of units, said groups of contacts being offset with respect to each other so that the corresponding contacts of different groups will not be energized simultaneously.

5. System as claimed in claim 4, wherein said pulse generator provides pulses at a repetition rate of once a second.

6. System as claimed in claim 5, wherein said sequence switching means steps in synchronism with said pulse generator pulses, said sequence switching means being wired to interconnect individual units to the power source only after said sequence switching means has stepped through more than one sequential switching point.